United States Patent
Murto

(10) Patent No.: US 6,224,917 B1
(45) Date of Patent: May 1, 2001

(54) FEED SUPPLEMENT OF CALCIUM, XYLITOL AND ASCORBIC ACID

(75) Inventor: Maria Murto, Helsinki (FI)

(73) Assignee: Dominion Veterinary Laboratories, Winnipeg (CA)

( * ) Notice: Subject to any disclaimer, the term of this patent is extended or adjusted under 35 U.S.C. 154(b) by 0 days.

(21) Appl. No.: 09/297,889

(22) PCT Filed: Nov. 13, 1997

(86) PCT No.: PCT/FI97/00690

§ 371 Date: May 11, 1999

§ 102(e) Date: May 11, 1999

(87) PCT Pub. No.: WO98/20748

PCT Pub. Date: May 22, 1998

(30) Foreign Application Priority Data

Nov. 13, 1996 (FI) .................................................. 962811

(51) Int. Cl.⁷ ................................................... A23K 1/175
(52) U.S. Cl. ........................... 426/74; 426/392; 426/805; 426/807
(58) Field of Search .............................. 426/74, 807, 805, 426/392

(56) References Cited

U.S. PATENT DOCUMENTS

| 4,994,283 | 2/1991 | Mehansho et al. ................. 426/74 |
| 5,118,513 | 6/1992 | Mehansho et al. ................. 426/2 |
| 5,204,087 | 4/1993 | Moroi et al. ..................... 424/44 |
| 5,626,883 | * 5/1997 | Paul .............................. 424/605 |

FOREIGN PATENT DOCUMENTS

| 1319612 | 6/1993 | (CA) . |
| 1200250 | * 12/1998 | (CN) . |
| 823 083 | 7/1949 | (DE) . |
| 206 1370 | * 6/1971 | (DE) . |
| 2 061 370 | 6/1971 | (DE) . |
| 2 010 319 | 9/1971 | (DE) . |
| 0 297 681 A2 | 1/1989 | (EP) . |
| 312249 | * 4/1989 | (EP) . |
| 0 415 326 A1 | 3/1991 | (EP) . |
| 0 497 287 A1 | 8/1992 | (EP) . |
| 94715 | 7/1995 | (FI) . |
| 1576528 | 10/1980 | (GB) . |
| 8208517 | * 8/1996 | (JP) . |

OTHER PUBLICATIONS

English Abstract of ZA 9001364; Date: Jun. 26, 1991.
English Abstract of RU 2033048; Date: Apr. 20, 1995.

* cited by examiner

*Primary Examiner*—Chhaya D. Sayala
(74) *Attorney, Agent, or Firm*—Burns, Doane, Swecker & Mathis, L.L.P.

(57) ABSTRACT

The invention relates to a composition of a feed supplement. The composition contains a calcium source, sugar, and ascorbic acid, and no phosphorus has been added to it. The invention also relates to a use of the composition to support the skeletal metabolism in growing animals.

14 Claims, No Drawings

FEED SUPPLEMENT OF CALCIUM, XYLITOL AND ASCORBIC ACID

The present invention is a feed supplement intended to support the skeletal metabolism in growing animals.

The skeletal formation in growing animals has conventionally been supported by feed supplements. Different nutritional additives, such as minerals and vitamins, have been given. The results have varied. Now that industrially produced food is used, the animals grow even faster. The requirements for nutritional additives have grown. One has sought to solve the problem by supporting only the mineral metabolism.

Therefore it has been surprising to find a feed supplement composition whose support activity seems to affect the collagen synthesis in bone. The feed supplement is preferably in the form of powder. The results obtained in supporting the bone formation in growing animals have been decisively better than the earlier results. Conventional additives supporting the mineral metabolism can be added to the feed supplement powder of the invention. The feed supplement can be developed, within the above limits, so that the doses suit the species and age of the animal, the growth frame determined by the age, and the quality and quantity of the other food given. Each animal species has its own rate of growth, and the correct dose of the feed supplement is determined according to the species and the individual need. For example, a fast growing rate and the body weight of an adult animal can be the key factors when the need of the feed supplement is determined. A smaller species may grow more slowly and reach adulthood earlier, which means that a smaller amount of the feed supplement is needed for a shorter period of time. The animal's conditions of growth must also be taken into account, since the bone metabolism is known to be dependent on the amount of sunlight that the animal receives (e.g. vitamin D) and on the amount of sunlight that the plant consumed as feed has received. In arctic regions the requirements for feed supplements may be different from what they are elsewhere.

Complete foods contain large amounts of protein and ingredients, from which the animal also obtains a lot of phosphorus. The large amount of amino acid drives the chondrocytes to work. The feed contains a small amount of calcium and, because of their ingredients, a large amount of phosphorus. The result is an imbalance of phosphorus and calcium during the period of fast growth. The bone metabolism must then be supported if the feed fails to do so or if it even causes relative deficiencies. During the period of fast growth the metabolism of the soft bone matrix must also be heavily supported. Surprisingly, the feed supplement of the invention supporting the skeletal metabolism in growing animals supports the bones in such a way that the results are most significant.

Clinical experiments have shown that animals tolerate well the compositions prepared according to the present invention and find them extremely palatable. Also, calcium is absorbed well when the composition of the invention is used. Further, the composition has a beneficial effect on the absorption and utilization in the bones. Any adverse effect on hormonal balance, such as the PTH and the somatotropin and calcitonin metabolism, is avoided by the use of this feed supplement composition. Compositions prepared in accordance with the present invention can be used to support the skeletal metabolism by supplying high amounts of calcium to satisfy the calcium need of a gestating or lactating mammal or a growing animal, because the feed supplement prepared in accordance with the invention can be used together with all industrially produced ingredients. The composition of the feed supplement powder according to the invention is also such that xylitol and vitamin C, which are contained therein, support each other synergistically. The synergy of these ingredients yields surprising results in preventing the deficiencies caused by efficient feeding. These ingredients are part of the natural metabolism of the body and are not harmful to the metabolism even when used in such concentrations as in the present invention.

The present invention is a feed supplement composition intended to support the skeletal metabolism in growing animals, the composition being characterized in that it contains a calcium source, xylitol and ascorbic acid (vitamin C) in the weight ratio (1–8):(1–8):(1–5), and that no phosphorus has been added. The calcium source is, for example, calcium carbonate. In the mixture, xylitol has a beneficial effect on the formation of the soft bone matrix and enhances the utilization of calcium.

The feed supplement powder is prepared by mixing the calcium source, for example calcium carbonate, with xylitol and ascorbic acid. It is preferable to use the grade of ascorbic acid that is used in animal feed (Acid. ascorbic 98% DC respond) and calcium carbonate (natural chalk) as the technical grade that can be used in animal feed (Calc. carb. techn. Queensfil 240). A simple example is a dose of 1 kg. For example, 600 g of calcium carbonate and 300 g of xylitol and 100 g of ascorbic acid in powder form are mixed with one another in a pharmaceutically acceptable manner to produce animal feed. As the quantities of the ingredients vary according to the need within the above limits, minerals and vitamins conventionally used in veterinary medicine, flavouring agent and filling agents can also be used in the mixture in a pharmaceutically acceptable manner.

In the following examples, the suggested doses are stated in grams or milligrams per kg of the body weight of a growing animal. For example, a puppy weighing 15 kg is given the powder of the above example in the amount of 0.3 to 1 g per kg of its body weight per day. The puppy is given the powder in addition to food from immediately after the weaning until the requirements of its skeletal metabolism have been met. Preferably, the powder can also be given safely to a gestating bitch 30 to 20 days before the delivery. The preferred dose is then 1 g of the powder of the example per kg of its body weight. In other words, if the bitch weighs 40 kg 20 days before the estimated delivery, it is given 40 g of powder per day. The bitch will be given the powder after the delivery without interruption at least up to the weaning, for the entire period of lactation. Where chickens are concerned, the suitable dose of powder would be, for example, about 1 to 20 g/kg of feed, considering their fast growing rate. Chickens consume about three kg of feed in their 36-day life.

When clinical experiments were performed in the above manner, i.e. by giving a gestating bitch a preferred feed supplement powder according to the invention, the puppies were born in excellent condition. The coat was shiny and the skeletal structure was strong and balanced in all the puppies. In fact, the skeletal structure and the puppies were remarkably well-built and strong. The birth weight of the puppies was optimal. After the birth, the puppies developed in a surprisingly balanced and stable manner.

An essential feature in the inventiveness of the composition of the feed supplement powder is that the ingredients are supplied simultaneously and that they thus support each other synergistically in the biological process of bone formation.

A feed supplement with a composition according to the invention is prepared/used to support the skeletal metabolism in growing animals in a preventive manner/to treat deficiencies/disorders that lead to conditions generally known as skeletal dysplasias. The feed supplement powder can be given to all growing animals that are relevant in this connection, for example fishes, fowls and mammals. Preferably, the feed supplement powder with the composition according to the invention is given, for example, to dogs. Another preferred field of use of the feed supplement according to the invention is in the breeding of broilers. In addition to the above examples, the use of the powder in the prevention of skeletal conditions known as dysplasias can be developed further.

In growing domestic animals, skeletal dysplasias occur during the period of fast growth, for example, in horses, cows, pigs, fowls and dogs. Because the long bones and the condyle are soft, clinical symptoms occur that can be verified macroscopically, radiologically and optionally histologically. These dysplasias have many names. Those who consider dysplasias to be hereditary have named the changes in different ways. The names have often been given on the basis of the joint where the condition has started or where it can be the most clearly detected by the above methods. The common feature in all these dysplasia conditions, no matter which animal or which bone or joint they affect, is that they often incapacitate the individual totally. In certain animal species, especially in pets and 'non-useful' animals, an operation is used as a treatment. Horses are also operated on. The surgical operation is expensive, and so is the preceding examination of the patient. The outcome of the operation, in terms of restoration of health, varies with the patient.

Chemical agents that can be injected into the animal or into a certain joint of the animal have also been developed. The aim is to alleviate arthrosis generally associated with the condition, and reduce the pain caused by it. The restoration of health, however, cannot be guaranteed even with the use of these chemicals.

The feed supplement composition according to the invention plays an important role in supporting the skeletal metabolism in a preventive manner in the deficiencies and disorders that lead to the conditions generally known as dysplasias. Since, for example, it is known that the skeletal growth in dogs is polygenetically hereditary, the only way of dealing with the conditions in these animals is to efficiently support the skeletal metabolism in a preventive manner.

The dysplasia conditions include, for example:
panosteitis=inflammation of the periosteum in e.g. long bones
hypertrophic osteodystrophia (HOD)=disturbance of growth in long bones
osteochondritis=lesion of the condyle
osteochondritis dissecans (OD)=lesion of the condyle including a loose flap
hip dysplasia=disturbance of growth in the hip joint
elbow dysplasia=disturbance of growth in the elbow joint
tibial dyschondroplasia.
In broiler production a major problem is posed by an ossification disorder in the cartilage of the tibia in birds, i.e. tibial dyschondroplasia (TD), which causes the weakening of the bones in the bird legs. Because of a pain in the legs, the movements and the well-being of the birds are impaired, the mortality rises and the production suffers. The aetiology of the condition is unknown, and although it has been possible to eliminate some causes, such as the chondrodystrophy caused by a deficiency of simple nutrients, the TD is still the single most important factor impairing the well-being of the growing birds.

The use of the feed supplement according to the invention in feeding the chickens significantly improved the condition of the bones in broilers and decreased the consumption of feed. The well-being of the birds increased, and they were able to move normally. Despite the increase in vitality, the consumption of feed dropped by over 7%. This has a significant effect on the production costs, and it is also significant with respect to the amount of feed saved globally in the feeding of the birds, i.e. with respect to the ratio between the feed used to produce food and the food produced. The reduced need of feed also reduces the amount of excrement.

In the following the intention will be illustrated by examples, which do not, however, restrict the invention in any way.

EXAMPLE 1

The effect of the feed supplement according to the invention on skeletal metabolism was studied on Ross chickens. Two groups of 50 newly-hatched chicks with the same distribution of genders were used. The chickens in the test group were fed with industrial broiler feed (Broiler Herkku 1 S CC, Rehuraisio Oy, Finland) to which the feed supplement of the invention had been added. The feed supplement contained calcium carbonate, xylitol and ascorbic acid in the weight ratio 3:2:1, 1500 g in 160 kg of feed. The chickens in the control group were fed with the same industrial broiler feed but without the feed supplement.

The breeding conditions were arranged to be similar to real-life breeding conditions. The chickens were bred on a turf bed that was not changed, in deep litter conditions. Food and drink were freely available. The light, temperature, moisture and ventilation conditions were normal. The experimental plots were next to each other. During the breeding period, one chicken in the test group had to be killed due to its poor growth. One chicken in the control group died of heart failure, and another one had to be killed for the same reason.

The weight and feed consumption of the chickens were observed. The test animals were subjected to a clinical veterinary examination once a week. Their health was observed on the basis of their mobility, social behaviour and happiness.

During the experiment the chickens in the test group were recorded to be lively, to move and to scratch the ground, to be social and playful and active. The chickens in the test group also bathed often in the turf and, as they grew up, they put up 'cockfights'. A clinical examination of the chickens at the age of three and a half weeks showed that the ankles (metatarsi) of the chickens in the test group were markedly thin in view of the size of the broiler.

The chickens in the control group stayed more in one place, followed the feeding dish, moved more slowly and did not play or bathe. They moved less up and down on their feet. At the age of three and a half weeks, the chickens were observed to have thick ankles, i.e. they suffered from the TD.

On the 34th day of the experiment, the chickens in the test group were weighed as a group, and so were the chickens in the control group. All the animals were slaughtered when they were 36 days old. In connection with the slaughter, each chicken was weighed with the accuracy of one gram using a digital balance. The weight of the test group as a whole was a couple of percentages smaller than that of the control group. Otherwise the chickens in both groups had grown well and normally considering the conditions. Surprisingly, the chickens in the test group had consumed 7% less feed and yet attained the same weight.

In connection with the slaughter, the left ankle of each broiler was measured at the middle point in the mediolateral direction and in the dorsocaudal direction with the accuracy of one tenth of a millimeter using a nanometer. Table 1 shows the results obtained in the control group (A) and in the test group (B).

TABLE 1

The weight of the chicken vs. the thickness of the ankle in the mediolateral direction (M) and in the dorsocausal direction (D)

| Control group (A) | | | | Test group (B) | | | |
|---|---|---|---|---|---|---|---|
| weight (kg) | chicken no. | M (cm) | D (cm) | weight (kg) | chicken no. | M (cm) | D (cm) |
| 2.460 | 1A | 1.76 | 1.91 | 2.440 | 3B | 1.60 | 1.65 |
| 2.380 | 2A | 1.90 | 2.15 | 2.300 | 4B | 1.48 | 1.50 |
| 2.220 | 3A | 1.70 | 1.84 | 2.300 | 5B | 1.61 | 1.69 |
| 2.200 | 4A | 1.80 | 1.82 | 2.280 | 6B | 1.70 | 1.81 |
| 2.180 | 5A | 1.70 | 1.74 | 2.280 | 7B | 1.71 | 1.81 |
| 2.180 | 6A | 1.80 | 1.80 | 2.180 | 8B | 1.52 | 1.70 |
| 2.140 | 7A | 1.71 | 1.80 | 2.180 | 9B | 1.50 | 1.61 |
| 2.120 | 8A | 1.60 | 1.78 | 2.180 | 10B | 1.80 | 1.80 |
| 2.100 | | 1.44 | 1.52 | 2.160 | | 1.45 | 1.72 |
| 2.100 | | 1.75 | 1.74 | 2.140 | | 1.60 | 1.82 |
| 2.100 | | 1.62 | 1.69 | 2.160 | | 1.55 | 1.52 |
| 2.060 | | 1.69 | 1.69 | 2.160 | | 1.53 | 1.55 |
| 2.060 | | 1.60 | 1.60 | 2.160 | | 1.69 | 1.62 |
| 2.020 | | 1.59 | 1.51 | 2.100 | | 1.54 | 1.62 |
| 2.020 | | 1.50 | 1.61 | 2.100 | | 1.54 | 1.63 |
| 2.020 | | 1.61 | 1.71 | 2.080 | | 1.44 | 1.54 |
| 2.000 | | 1.52 | 1.61 | 2.040 | | 1.61 | 1.62 |
| 1.980 | | 1.57 | 1.60 | 2.020 | | 1.59 | 1.78 |
| 1.980 | | 1.71 | 1.80 | 1.980 | | 1.58 | 1.68 |
| 1.980 | | 1.80 | 1.73 | 1.900 | | 1.52 | 1.70 |
| 1.960 | | 1.74 | 1.81 | 1.900 | | 1.50 | 1.62 |
| 1.940 | | 1.50 | 1.55 | 1.900 | | 1.69 | 1.79 |
| 1.940 | | 1.51 | 1.61 | 1.880 | | 1.61 | 1.68 |
| 1.900 | | 1.63 | 1.65 | 1.840 | | 1.53 | 1.55 |
| 1.900 | | 1.62 | 1.65 | 1.820 | | 1.46 | 1.51 |
| 1.920 | | 1.62 | 1.61 | 1.820 | | 1.40 | 1.69 |
| 1.920 | | 1.48 | 1.62 | 1.820 | | 1.31 | 1.48 |
| 1.860 | | 1.52 | 1.55 | 1.820 | | 1.54 | 1.54 |
| 1.860 | | 1.52 | 1.59 | 1.800 | | 1.39 | 1.56 |
| 1.820 | | 1.64 | 1.79 | 1.780 | | 1.39 | 1.51 |
| 1.800 | | 1.59 | 1.71 | 1.760 | | 1.41 | 1.52 |
| 1.800 | | 1.60 | 1.60 | 1.760 | | 1.53 | 1.56 |
| 1.760 | | 1.65 | 1.71 | 1.760 | | 1.49 | 1.69 |
| 1.760 | | 1.70 | 1.62 | 1.720 | | 1.49 | 1.58 |
| 1.740 | | 1.66 | 1.78 | 1.720 | | 1.39 | 1.57 |
| 1.720 | | 1.58 | 1.58 | 1.700 | | 1.47 | 1.69 |
| 1.720 | | 1.50 | 1.45 | 1.660 | | 1.46 | 1.52 |
| 1.700 | | 1.52 | 1.70 | 1.660 | | 1.49 | 1.67 |
| 1.680 | | 1.59 | 1.60 | 1.640 | | 1.50 | 1.40 |
| 1.680 | | 1.39 | 1.41 | 1.660 | | 1.41 | 1.68 |
| 1.680 | | 1.62 | 1.64 | 1.640 | | 1.51 | 1.53 |
| | | | | 1.620 | | 1.58 | 1.50 |
| 1.680 | 9A | 1.48 | 1.53 | 1.620 | 11B | 1.58 | 1.73 |
| 1.660 | 10A | 1.44 | 1.61 | 1.580 | 12B | 1.50 | 1.52 |
| 1.640 | 11A | 1.49 | 1.53 | 1.580 | 13B | 1.36 | 1.61 |
| 1.640 | 12A | 1.48 | 1.57 | 1.520 | 14B | 1.39 | 1.52 |
| 1.640 | 13A | 1.56 | 1.66 | 1.460 | 15B | 1.41 | 1.52 |
| 1.620 | 14A | 1.59 | 1.69 | 1.400 | 16B | 1.39 | 1.60 |
| 1.600 | 15A | 1.52 | 1.61 | 1.380 | 17B | 1.41 | 1.37 |

In connection with the slaughter, samples were taken at the upper part of the tibiae of the eight heaviest and the seven lightest chickens both in the test group and in the control group (chickens 3B to 10B, 11B to 17B and, respectively, 1A to 8A and 9A to 15A) and put in formaline dishes. In addition, the soft matrix of the cardiac, the hepatic and the renal tissue were sampled. All samples were given code numbers. The samples were treated, dyed and assessed as a blind test in a conventional manner that is well-known in veterinary medicine. The samples were dyed using H&E dye.

The different cartilage layers at the upper part of the tibia, the articular cartilage and the growing cartilage layers, and the ossification zone were measured with the accuracy of one tenth of a millimeter using a gauge attached to a microscope. The results obtained on the chickens of the control group (A) and on those of the test group (B) are shown in Table 2.

TABLE 2

The thickness of the articular cartilage layer, the growing cartilage layer and the ossification zone in the tibia of the chickens

| Chicken no. | Articular cartilage layer/mm | Growing cartilage layer/mm | Ossification zone mm |
|---|---|---|---|
| A1 | 3.2 | 2.1 | 7.5 |
| A2 | 3.6 | 1.2 | 6.4 |
| A3 | 2.7 | 1.5 | 4.7 |
| A4 | 3.4 | 1 | 4.1 |
| A5 | 3.8 | 0.9 | 4.3 |
| 1A6 | N.P. | N.P. | 4.2 |
| 1A7 | 2.2 | 0.8 | 4.1 |
| 1A8 | 2.8 | 1.1 | 3.9 |
| A10 | 1.8 | 0.8 | 4.2 |
| A11 | 2.8 | 1 | 5 |
| A13 | 2.2 | 1.1 | 5.4 |
| A14 | 2.3 | 1.1 | 4.5 |
| A15 | 2.5 | 0.8 | 4.4 |
| Averagevalue | 2.8 | 1.1 | 4.8 |
| 2B3 | 3.5 | 0.6 | 4.8 |
| 2B4 | 3.7 | 1.1 | 6.1 |
| 2B5 | 3.6 | 1.1 | 6.1 |
| 2B6 | 2.4 | 0.8 | 4.5 |
| 2B7 | 3 | 0.8 | 4.4 |
| 2B8 | 3.3 | 1 | 3.9 |
| 2B9 | 3.2 | 0.9 | 5.5 |
| 2B10 | 4 | 1 | 3.1 |
| B11 | 3 | 1 | 4.3 |
| B12 | 2.4 | 1.1 | 4.5 |
| B13 | 2.9 | 1 | 5.1 |
| B14 | 2.5 | 0.5 | 3.9 |
| B15 | 2.8 | 0.8 | 4.3 |
| B16 | 2.1 | 0.8 | 4.8 |
| Averagevalue | 3 | 0.9 | 4.7 |

N.P. = not measured

When the thickness of the different cartilage layers, the articular and the growing cartilage layers, and the ossification zone at the upper end of the tibia were measured, the articular cartilage of the chickens in the test group was observed to be more solid. In addition, the transitional growing cartilage layer situated below it had developed markedly better than the cartilage layer of the chickens in the control group.

No differences were observed in the soft matrix samples. With regard to the tissue of the tibia the test group and the control group differed considerably. In the test group, the articular cartilage layer was on the average about 10% thicker than in the control group (3.0 vs. 2.8), whereas the thickness of the growing cartilage layer was on the average about 20% smaller in the test group than in the control group. The 20% drop in the growing cartilage is significant and shows that the skeletal metabolism in the test group is normal. The greater thickness of the growing cartilage in the control group, in turn, is a symptom of the TD. In the ossification zone, no differences were observed between the groups.

In the load-carrying long bones the tibia is subjected to great physical stress as the broiler multiplies its weight dozens of times in 35 days. The fact that the metabolism in the tibia tissue is defective appears as dysplasias of the cartilage in the tibia of the control chickens, i.e. TD.

EXAMPLE 2

In the following we shall give some examples of the composition of the feed supplement powder according to the invention.

| Feed supplement powder, composition 1: | |
| --- | --- |
| calcium carbonate | 100 to 800 mg |
| xylitol | 100 to 800 mg |
| ascorbic acid | 100 to 500 mg |

The unit of weight of the feed supplement powder is gram (g).

| Feed supplement powder, a preferred composition: | |
| --- | --- |
| calcium carbonate | 200 to 600 mg |
| xylitol | 100 to 500 mg |
| ascorbic acid | 100 to 200 mg |

The unit of weight of the feed supplement powder is gram (g).

| Feed supplement powder, a particularly preferred composition: | |
| --- | --- |
| calcium carbonate | 500 mg |
| xylitol | 250 mg |
| ascorbic acid | 250 mg. |

| Feed supplement powder, a particularly preferred composition: | |
| --- | --- |
| calcium carbonate | 600 mg |
| xylitol | 300 mg |
| ascorbic acid | 100 mg. |

| Feed supplement powder, other compositions: | | | | | |
| --- | --- | --- | --- | --- | --- |
|   | 1 | 2 | 3 | 4 | 5 |
| A | 500 mg | 700 mg | 500 mg | 600 mg | 800 mg |
| B | 300 mg | 150 mg | 250 mg | 300 mg | 100 mg |
| C | 200 mg | 150 mg | 250 mg | 100 mg | 100 mg |

The unit of weight of the feed supplement powder is gram (g).

The unit of weight of the feed supplement powder is gram (g).

Compositions 3 and 4 are the particularly preferred compositions of the powder according to the present invention. The amount of xylitol contained in the mixture supports the collagen synthesis in cooperation with vitamin C. In addition, xylitol and vitamin C greatly enhance the absorption and utilization of the calcium contained in the calcium carbonate.

What is claimed is:

1. A dry feed supplement composition, comprising a calcium source, xylitol, and ascorbic acid in the weight ratio (1–8):(1–8):(1–5), wherein the calcium source, the xylitol and the ascorbic acid are mixed with one another such that they synergistically support the calcium needs of a growing animal.

2. A composition according to claim 1, comprising calcium carbonate as the calcium source, xylitol, and ascorbic acid in the weight ratio 2:1:1.

3. A composition according to claim 1, comprising calcium carbonate as the calcium source, xylitol, and ascorbic acid in the weight ratio 6:3:1.

4. A composition according to claim 1, comprising calcium carbonate as the calcium source, xylitol, and ascorbic acid in the weight ratio 3:2:1.

5. A composition according to claim 1, further comprising minerals and vitamins for supporting the skeletal growth and metabolism in animals.

6. The composition according to claim 5, further comprising flavouring and filling agents.

7. A composition according to claim 1, wherein the composition is packed in preservable form.

8. A composition according to claim 1, wherein the composition supports the skeletal metabolism in growing animals.

9. The composition according to claim 1 wherein no phosphorus has been added to the composition.

10. A method for growing an animal, comprising the step of feeding an animal the feed supplement composition of claim 1.

11. A method for growing an animal, comprising the step of feeding an animal the feed supplement composition of claim 1, wherein the feed supplement composition supports the skeletal metabolism in a preventive manner and/or treats deficiencies and/or disorders that lead to skeletal dysplasias.

12. A method for growing an animal, comprising the step of feeding a gestating or lactating mammal the feed supplement composition of claim 1, wherein the feed supplement composition supports the skeletal metabolism by supplying amounts of calcium to satisfy the calcium need of the gestating or lactating mammal.

13. A method of supporting the skeletal metabolism in animals in a preventive manner and/or treating deficiencies and/or disorders that lead to skeletal dysplasias, comprising the step of feeding a gestating, lactating or growing animal an effective amount of the feed supplement composition according to claim 1 to support the skeletal metabolism of the animal.

14. A method of supporting skeletal metabolism in a growing animal comprising:

providing a composition comprising a calcium source, xylitol, and ascorbic acid in the weight ratio (1–8):(1–8):(1–5), wherein the calcium source, the xylitol and the ascorbic acid are mixed with one another such that they synergistically support the calcium needs of a growing animal; and feeding the composition to the animal to promote collagen synthesis, soft bone matrix formation and calcium utilization in the bones of the animal.

* * * * *